United States Patent
Fang et al.

(10) Patent No.: US 10,049,148 B1
(45) Date of Patent: Aug. 14, 2018

(54) ENHANCED TEXT CLUSTERING BASED ON TOPIC CLUSTERS

(71) Applicant: Medallia, Inc., Palo Alto, CA (US)

(72) Inventors: Ji Fang, Cupertino, CA (US); Pablo Zivic, Buenos Aires (AR); Yibin Lin, San Mateo, CA (US); Andrew Ko, Mountian View, CA (US)

(73) Assignee: Medallia, Inc., San Mateo, CA (US)

( * ) Notice: Subject to any disclaimer, the term of this patent is extended or adjusted under 35 U.S.C. 154(b) by 370 days.

(21) Appl. No.: 14/825,962

(22) Filed: Aug. 13, 2015

Related U.S. Application Data

(60) Provisional application No. 62/037,514, filed on Aug. 14, 2014.

(51) Int. Cl.
*G06F 17/30* (2006.01)

(52) U.S. Cl.
CPC .. *G06F 17/30598* (2013.01); *G06F 17/30011* (2013.01); *G06F 17/30345* (2013.01)

(58) Field of Classification Search
USPC .................................................. 707/739, 536
See application file for complete search history.

(56) References Cited

U.S. PATENT DOCUMENTS

| | | | | |
|---|---|---|---|---|
| 7,765,212 B2* | 7/2010 | Surendran | ............ | G06Q 10/107 707/738 |
| 7,983,902 B2* | 7/2011 | Wu | ............ | G06F 17/2745 704/1 |
| 8,554,618 B1* | 10/2013 | Gasch | ............ | G06Q 30/0241 705/14.4 |
| 8,676,815 B2* | 3/2014 | Deng | ............ | G06F 17/30705 707/749 |
| 9,317,593 B2* | 4/2016 | Marvit | ............ | G06F 17/30616 |
| 9,589,056 B2* | 3/2017 | Wang | ............ | G06F 17/30867 |
| 2001/0013047 A1* | 8/2001 | Marques | ............ | G06F 17/27 |
| 2007/0016473 A1* | 1/2007 | Anderson | ............ | G06Q 30/02 705/14.41 |
| 2008/0319746 A1* | 12/2008 | Okamoto | ............ | G06F 17/30719 704/245 |
| 2009/0109872 A1* | 4/2009 | Skubacz | ............ | H04L 41/14 370/254 |
| 2009/0327320 A1* | 12/2009 | Yan | ............ | G06F 17/30705 |
| 2011/0295612 A1* | 12/2011 | Donneau-Golencer | ............ | G06Q 30/02 705/1.1 |
| 2012/0131181 A1* | 5/2012 | Birkler | ............ | G06F 9/5083 709/224 |
| 2014/0143331 A1* | 5/2014 | Smith | ............ | G06F 17/2795 709/204 |
| 2014/0358912 A1* | 12/2014 | Dey | ............ | G06Q 50/01 707/724 |

* cited by examiner

*Primary Examiner* — Cam-Linh Nguyen
(74) *Attorney, Agent, or Firm* — Van Pelt, Yi & James LLP

(57) ABSTRACT

Text clustering includes: identifying, for a set of non-stop words in a text, a corresponding set of related topic clusters relating to the set of non-stop words, the identification being based at least in part on a plurality of topic clusters each comprising a corresponding plurality of topically related words and a corresponding cluster identifier; for non-stop words in the set of non-stop words that are identified to have corresponding related topic clusters, replacing the non-stop words with corresponding cluster identifiers of the corresponding related topic clusters to generate a clustered version of the text; and providing the clustered version of the text to be further analyzed.

21 Claims, 9 Drawing Sheets

ENHANCED TEXT CLUSTERING BASED ON TOPIC CLUSTERS

CROSS REFERENCE TO OTHER APPLICATIONS

This application claims priority to U.S. Provisional Patent Application No. 62/037,514 entitled ENHANCED TEXT CLUSTERING WITH CONCEPT CLUSTERING filed Aug. 14, 2014 which is incorporated herein by reference for all purposes.

BACKGROUND OF THE INVENTION

Text clustering is a technique of organizing and categorizing text information often used in text mining and natural language processing. Text clustering groups together similar text documents so the documents can be further analyzed. Traditional text clustering methods, such as Latent Dirichlet Allocation (LDA), hierarchical text clustering or K-means text clustering, usually suffer from certain drawbacks. First, the traditional methods require users to provide a predetermined number of groupings of similar text documents. However, users normally do not know how many categories or groupings exist in the data. Second, the traditional methods typically rely on an inefficient and often inaccurate document similarity measurement. In those methods, typically, documents in a data set are compared against each other to determine how similar they are based on how many overlapping words exist between each pair of documents. These traditional text clustering techniques are typically ineffective for short texts and can result in inaccuracies. For example, online comments, reviews, or survey responses often have only a few sentences. It is quite common for different words to be used to express the same concepts or topics, making the results of traditional text clustering methods unreliable. For example, "the employees were friendly" expresses a similar concept/topic as "the staff was accommodating"; however, because the keywords in these sentences ("employees" and "friendly" in the first sentence and "staff" and "accommodating" in the second sentence) are different, traditional text clustering techniques would not classify these two sentences as being similar and they are unlikely grouped into the same cluster. Further, given the large volumes of short texts such as online comments and reviews, there is a growing need for automated analysis of such texts to provide reports, feedback, etc. to the end user. A more accurate text clustering technique is therefore needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Text clustering is described. In some embodiments, for a set of non-stop words in a text, a corresponding set of related topic clusters is identified based at least in part on a plurality of topic clusters each comprising a plurality of topically related words and a corresponding cluster identifier. Non-stop words that are identified to have corresponding related topic clusters are replaced with corresponding cluster identifiers as most appropriate in the context to generate a clustered version of the text. The clustered version of the text is provided to be further analyzed. In some embodiments, the topic clusters are generated by selecting seed words and finding topically related words leveraging word similarities automatically learned using a training data set.

Figure 1:
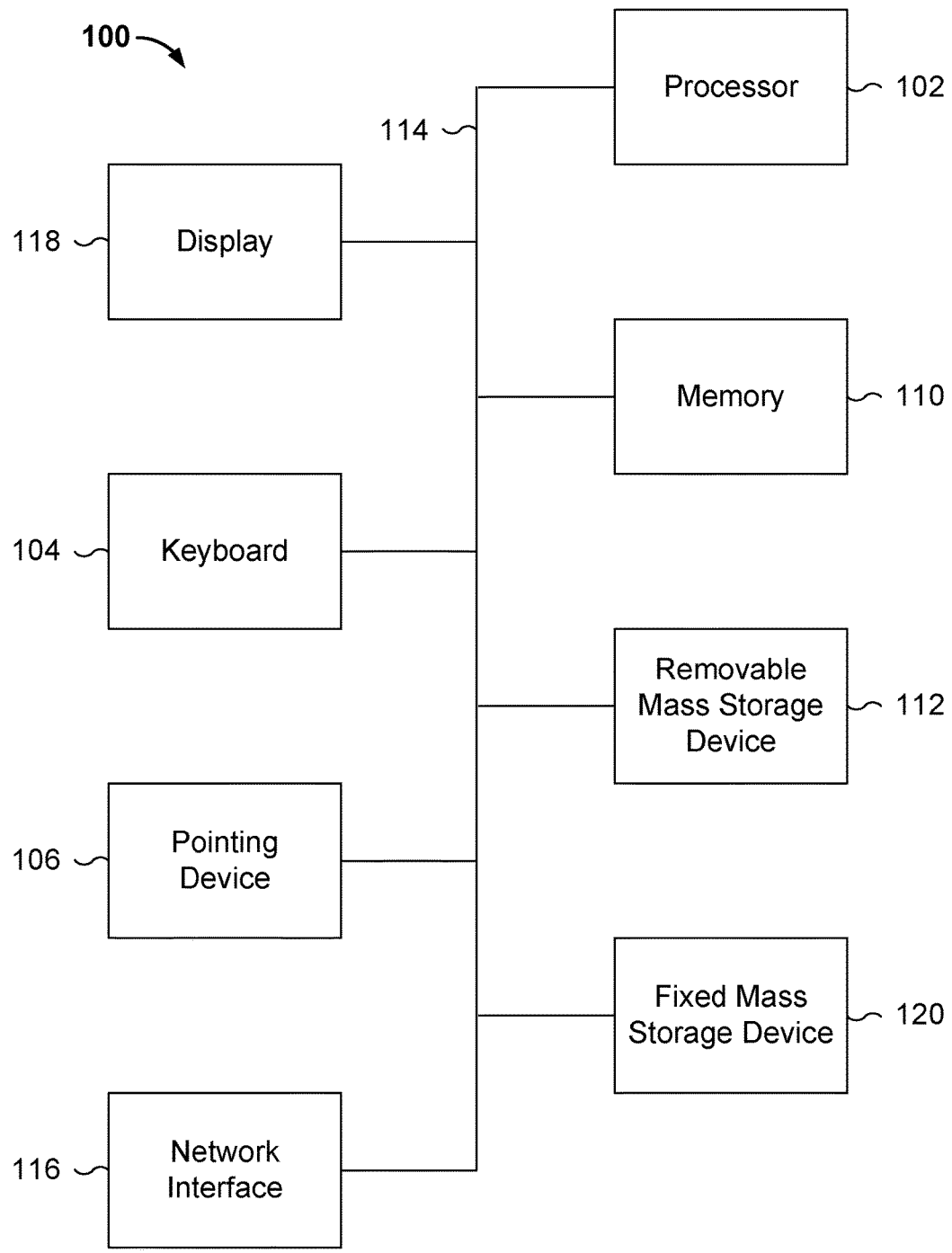
FIG. 1 is a functional diagram illustrating a programmed computer system for performing enhanced text clustering in accordance with some embodiments.

FIG. 1 is a functional diagram illustrating a programmed computer system for performing enhanced text clustering in accordance with some embodiments. As will be apparent, other computer system architectures and configurations can be used to perform text clustering. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to execute/perform the processes described below.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2A:
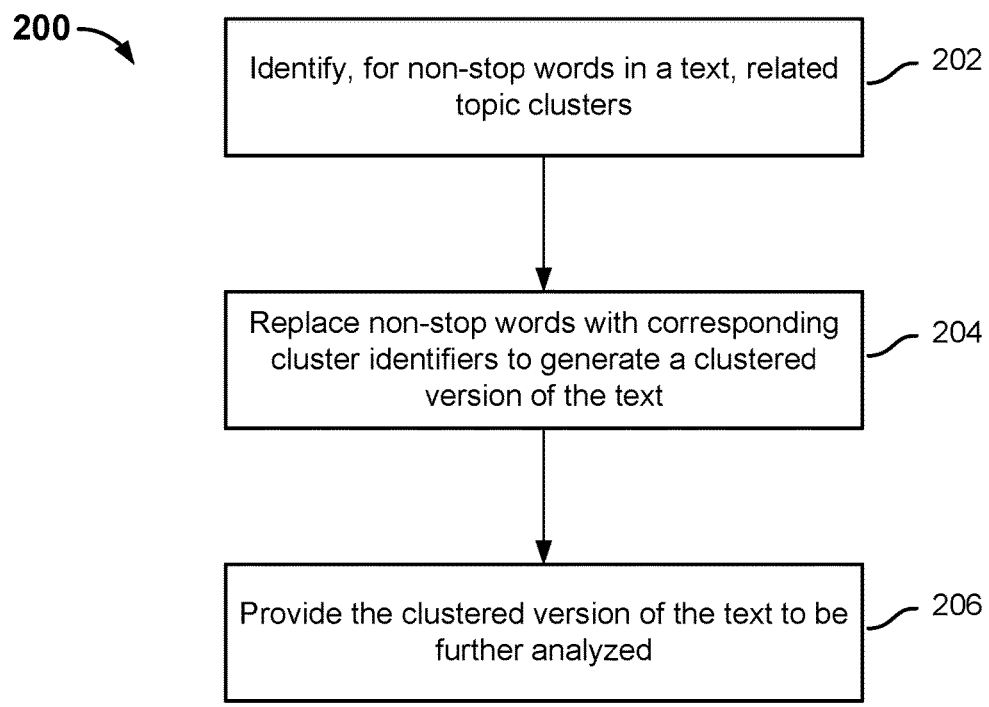
FIG. 2A is a flowchart illustrating an embodiment of a process for performing topic-based clustering.

FIG. 2A is a flowchart illustrating an embodiment of a process for performing topic-based clustering. Process 200 can be performed on a system such as 100.

In some embodiments, a text comprising one or more sentences (e.g., a comment, a review, a message, etc.) is preprocessed before it is subject to clustering operations. In some embodiments, during the preprocessing, stop words and/or non-stop words in a text are identified. As used herein, stop words refer to the most common words in a language, such as "the," "a," "was," "is," "I," "you," etc. in English. Stop words typically do not convey information about the concept or topic pertaining to the sentence and therefore are not further processed. Stop words can be identified using conventional techniques such as looking up in a stop word dictionary. The identified stop words can be removed or marked. The remaining words in the text are non-stop words. For example, for the text "the employee was friendly," the non-stop words are "employee" and "friendly;" for the text "the staff was accommodating," the non-stop words are "staff" and "accommodating." For purposes of illustration, single-sentence text examples are discussed extensively throughout this specification, although the technique described can also be applied to multi-sentence texts.

At 202, for the set of non-stop words in a text, a corresponding set of topic clusters related to the set of non-stop words is identified.

As used herein, a topic cluster (also referred to as a related concept cluster) comprises a set of words or phrases (collectively referred to as words herein for the sake of brevity) pertaining to a particular topic, and a cluster identifier (also referred to as a cluster label). Preferably, domain-dependent topic clusters are used so that the topic clusters and the words included in the topic clusters are domain specific (in other words, pertaining to specific areas such as industry, product, etc.).

Figure 2B:
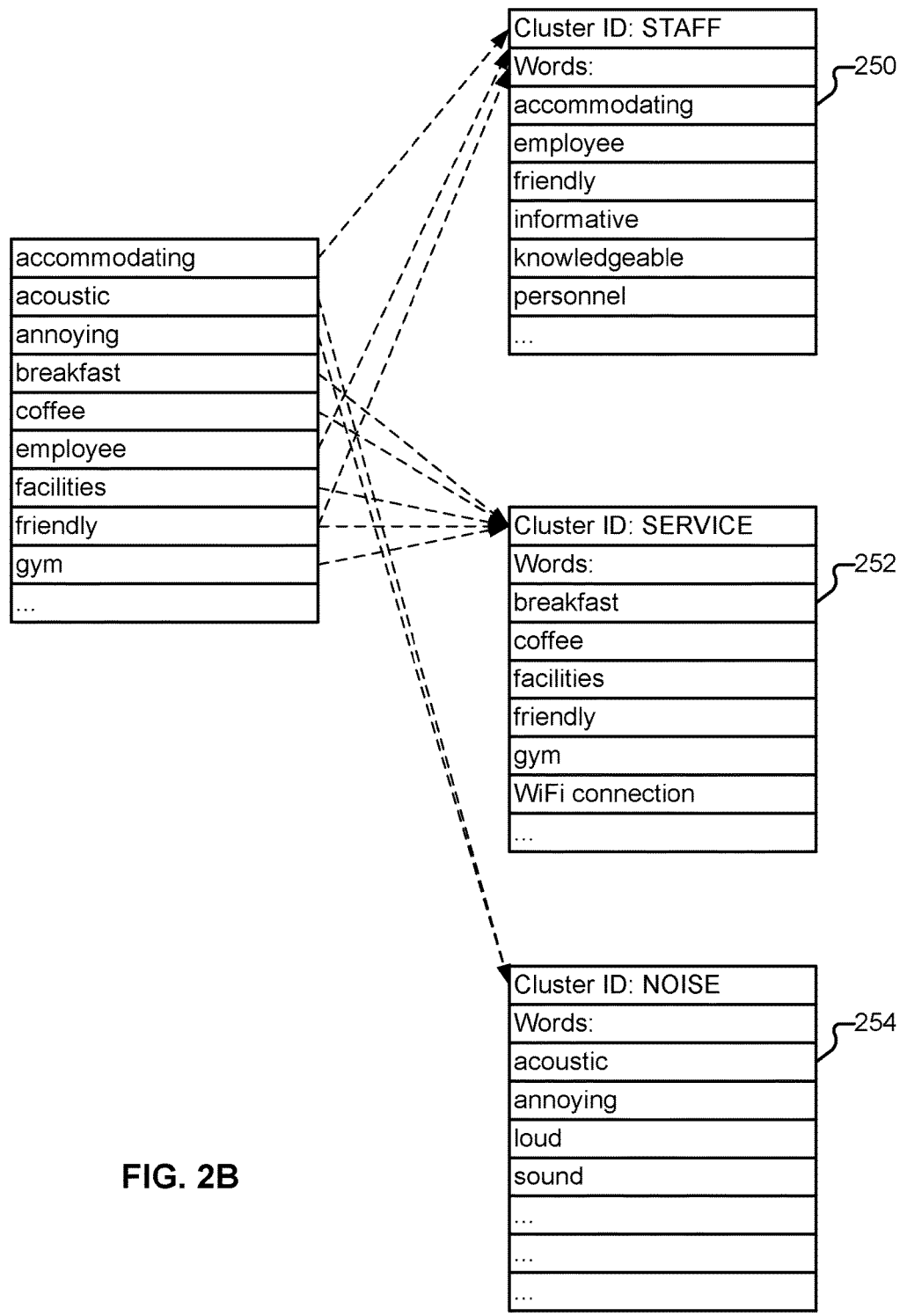
FIG. 2B is a data diagram illustrating some example topic clusters and words mapping to the topic clusters.

FIG. 2B is a data diagram illustrating some example topic clusters and words mapping to the topic clusters. In this example, the topic clusters are specific to the domain of hospitality industry. A first topic cluster 250 has the following information: {cluster identifier=STAFF; cluster words=employee, personnel, knowledgeable, friendly, accommodating, informative, . . . }; a second topic cluster 252 has the following information: {cluster identifier=SERVICE; cluster words=breakfast, coffee, facilities, gym, WiFi connection, friendly, . . . }; a third topic cluster has the following information: {cluster identifier=NOISE; acoustic, annoying, loud, sound, . . . }. As shown herein, cluster identifiers are words. Other identifiers such as alphanumerical strings, numbers, etc. can be used. The format of the topic cluster is implementation dependent and can vary in other embodiments. In some embodiments, many topic clusters are generated, stored in a database and/or memory, and made available for the clustering process. How to generate these topic clusters is described in greater detail below in connection with FIGS. 4-7. How to identify a related topic cluster for a specific non-stop word and replace the non-stop word with the most appropriate cluster identifier in the context is described in greater detail below in connection with FIG. 3.

Returning to FIG. 2A, for the text "the employee was friendly," the non-stop words of "employee" and "friendly" are both identified to be related to the above mentioned first topic cluster that has a cluster identifier of "STAFF." Similarly, for the text "the staff was accommodating," the non-stop words of "staff" and "accommodating" are also identified to be related to the topic cluster of "STAFF." At 204, the non-stop words in the text are replaced with their corresponding cluster identifiers and thus transformed into a clustered version (also referred to as a canonicalized version) of the text. For example, "the employee was friendly" is transformed into "the STAFF was STAFF," and "the staff was accommodating" is also transformed into "the STAFF was STAFF." As can be seen, the original sentences, which relate to the same topic but previously using traditional clustering techniques would have been treated as being unrelated because of the lack of overlapping non-stop words, are now deemed to be identical because of the transformation involving word replacements. Clustering accuracy is thus significantly improved.

The non-stop words in a sentence can be related to multiple topic clusters. For example, "the facility was noisy" includes the non-stop words "facility" and "noisy" which are related to topic clusters having cluster identifiers of "SERVICE" and "NOISE," respectively, and therefore is transformed into "the SERVICE was NOISE."

Once a clustered version of the text is generated, it becomes easier and more efficient for other programs to analyze the text for various applications such as information retrieval and presentation. At 206, the clustered version of the text is provided to an analysis program or module to be further analyzed. In various embodiments, the clustered version of the text is output to a file, a database, a storage, a data stream, a buffer, a memory, or the like, and used by another analysis tool. The clustered result is usable by many text analysis tools, such as the Medallia Text Analytics™ product which analyzes customer experiences using clustered text generated based on customer online reviews and provides feedback to vendors or service providers.

Using clustered versions of texts simplifies the ultimate goal of text clustering into an information retrieval task: now every piece of text can be indexed by its associated topic clusters, different texts related to the same topic can then be easily retrieved and grouped together through a simple index searching. The search and retrieval speed for texts relating to specific topics is greatly improved. The amount of memory and processing cycles required for the processing can also be reduced. For example, rather than storing the full text strings of "the employee was friendly" and "the staff was accommodating" and/or comparing the strings individually, a count associated with the topic cluster of "STAFF" is used to track the number of times the topic of "STAFF" comes up in the texts. The analysis tool can use this information to provide feedback to an end user. For example, the analysis tool may track the frequency a topic appears in all the texts being processed. If the topic "STAFF" comes up 50% of the time, while no other single topic comes up more than 10% of the time, a higher level analysis tool would present a result to the end user (e.g., in a chart, a user interface display, a message, or the like) indicating that the topic of "STAFF" is of particular concern to the customers. An end user (such as a business owner), who would have had trouble processing thousands or more customer comments manually, can now utilize the analysis tools based on the clustered text to obtain accurate and objective measurements of topics covered by the customer comments and gain valuable insights. More importantly, the accuracy of the final clustering results is improved significantly because the clustered versions of texts are based on conceptual similarity rather than overlapping words as adopted by conventional techniques. Also, the technique described herein does not require the user to provide a predetermined number of topic clusters for the data to be analyzed, which is a number that the user normally does not know how to estimate. Therefore, the technique described herein addresses the major drawbacks of the conventional text clustering methods.

Figure 3:
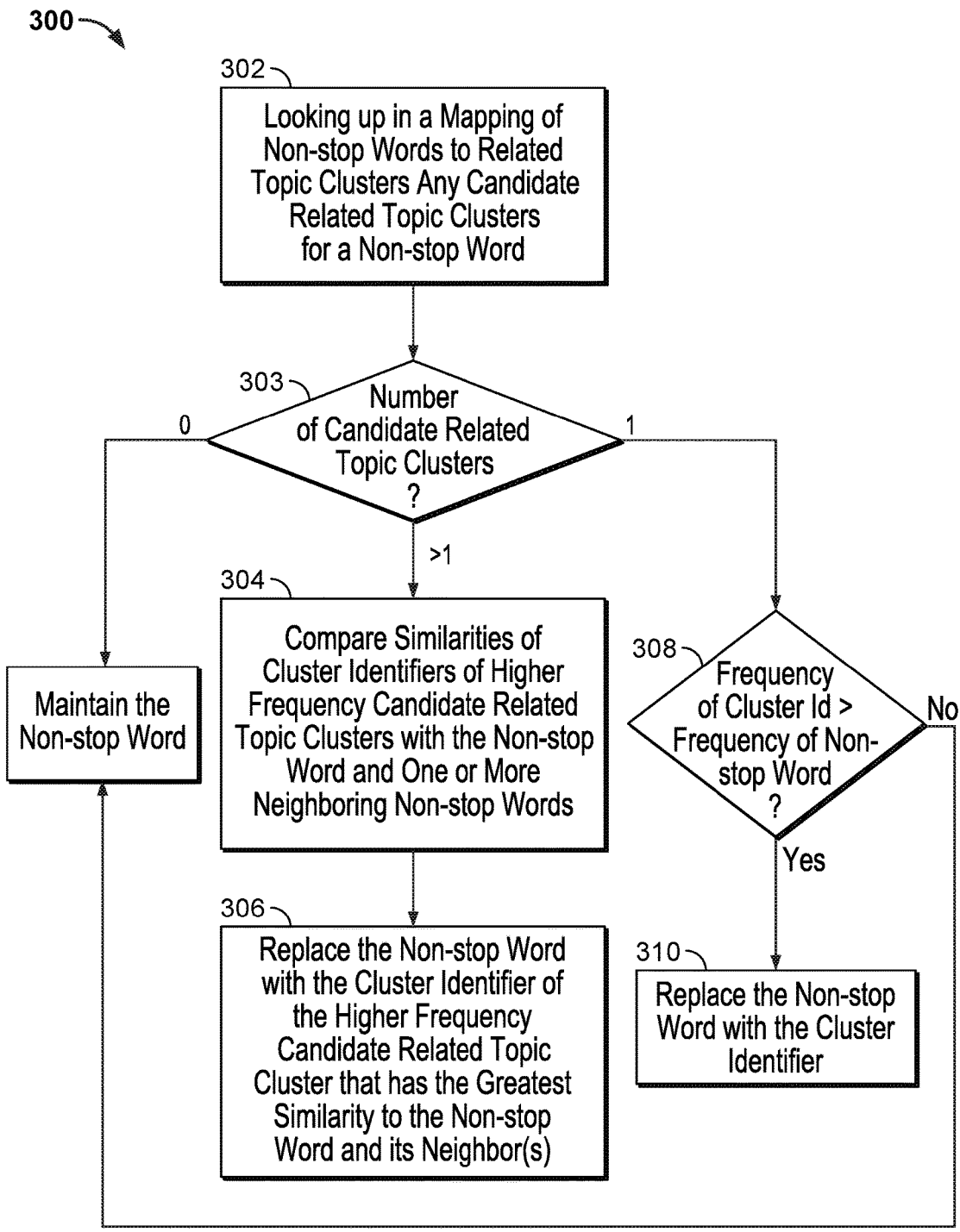
FIG. 3 is a flowchart illustrating an embodiment of a process for processing a non-stop word in a text.

FIG. 3 is a flowchart illustrating an embodiment of a process for processing a non-stop word in a text. Process 300 can be used to implement 202 of process 200. In some embodiments, process 300 is repeated for individual non-stop words so that the non-stop words are replaced with corresponding cluster identifiers as appropriate. Process 300 can be repeated by executing serially and/or in parallel.

Figure 4:
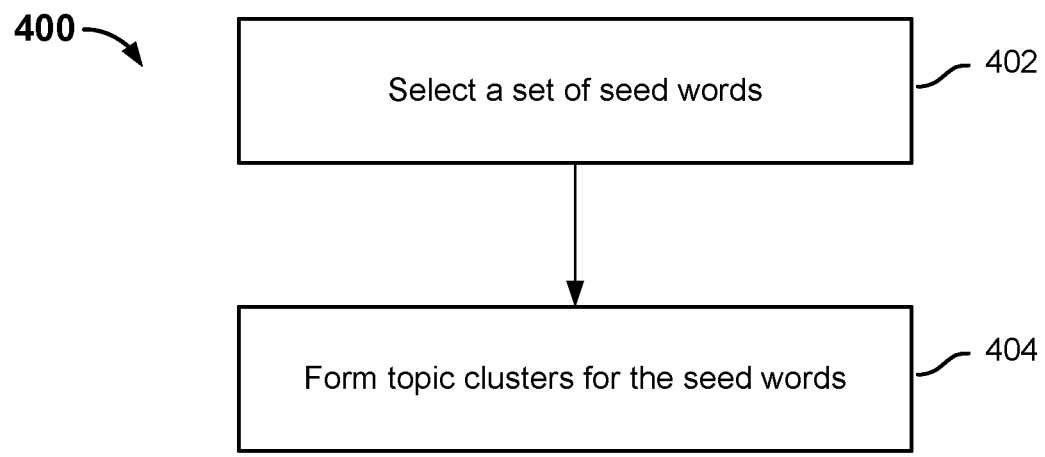
FIG. 4 is a flowchart illustrating an embodiment of a process for generating topic clusters.

In some embodiments, assuming that the topic clusters have already been constructed using a process such as 400 of FIG. 4, based on these topic clusters, a mapping of non-stop words to topic clusters can be established. Referring again to FIG. 2B, words such as "employee," "personnel," "knowledgeable," "friendly," "accommodating," "informative," etc. are mapped to the topic cluster with the identifier of "STAFF;" words such as "breakfast," "coffee," "facilities," "gym," "WiFi connection," "friendly," etc. are mapped to the topic cluster with the identifier of "SERVICE," and so on. In some embodiments, the words are sorted or indexed for the ease of search, and are associated with the clusters using the identifiers, references, pointers, or the like.

At 302, a given non-stop word (denoted as W) is looked up in the mapping of non-stop words to topic clusters. The results that are found are deemed to be candidate related topic clusters. A non-stop word can have no candidate related topic cluster because it is not mapped to any topic cluster in the mapping table, have a single candidate related topic cluster (e.g., the word "employee" is only mapped to the topic cluster of "STAFF"), or have multiple candidate related topic clusters (e.g., the word "friendly" is associated with the topic clusters of "STAFF" and "SERVICE.") Depending on the number of candidate related topic clusters found at 303, different processing can take place.

If the number of candidate related topic cluster is 0, then the non-stop word is maintained rather than replaced and no action is required. This can happen when the specific non-stop word is not conceptually related to any of the constructed topic clusters.

If the number of candidate related topic cluster is 1, at 308, it is further determined whether the frequency of the candidate related topic cluster's cluster identifier (denoted as X) is greater than the frequency of W. As used herein, the frequency of a given word refers to a measurement of how often the word appears in the data set being processed. In some embodiments, the frequency of a non-stop word W corresponds to the number of times the non-stop word appears in all the texts being processed. The frequency of the cluster identifier X corresponds to the number of times X appears in all the texts being processed. Other frequency measures can be used. If the frequency of X is not greater than the frequency of W, then W is maintained in the text rather than replaced. If the frequency of X is greater than the frequency of W, at 310, W is replaced with X.

If the number of candidate related topic cluster (denoted as N) is greater than 1, then a specific candidate related topic cluster is identified and selected as the related topic cluster for W. In particular, at 304, the similarities of cluster identifiers of certain higher frequency candidate related topic clusters are compared with W and one or more neighboring non-stop words of W. The high frequency candidate related topic clusters are those candidate clusters whose cluster identifiers appear more frequently than W. The cluster identifiers of a high frequency candidate related topic cluster is denoted as $X_i$, where i=1, 2, . . . N. In some embodiments, in the event that W is the first word in the text being processed, the similarities of each $X_i$ compared with W and with the word following W are determined and summed. In the event that W is the last word in the text, the similarities of each $X_i$ compared with W and the word preceding W are computed and summed. In other cases, the similarities of each $X_i$ compared with W, the word preceding W, and the word following W are computed and added.

In some embodiments, a machine learning tool such as the word2vec tool provided by Google®, Python Gensim, or the like can be used to learn the similarity of two words (e.g., $X_i$ and W). For example, the word2vec tool learns a model which includes vector representations of words from a set of training text data. The training text data can be a different set of data in the same domain (e.g., customer reviews for the hospitality industry). Once the model is trained, word similarities can be further computed by a similarity measurement because now all the words are vectorized. Common similarity measurements include measurements such as Cosine Similarity, Manhattan Similarity and Euclidean Distance etc. Once the similarities of the word pairs in the training set are computed, a similarity model can be developed to take an input word and output a set of word vectors, such as a sorted list of M words in the training set that are ranked by their similarity scores (also referred to as distances) relative to the input word. For example, for the input word "employee", the similarity model can output 50 similar words found in the training data, such as "staff," "personnel," "worker," etc., each having a corresponding score indicating how similar the word is to "employee".

At 306, the $X_i$ that has the greatest similarity sum is chosen to replace W in the text. For example, "employee" is replaced with "STAFF."

Process 300 can be repeated for all the non-stop words in the text to generate the clustered version of the text.

FIG. 4 is a flowchart illustrating an embodiment of a process for generating topic clusters. Process 400 can be performed on a system such as 100. Process 400 can be carried out on the same system as process 200 or on a different system.

At 402, a set of seed words are selected from a training data set, which can be the set of texts to be processed or a body of text data from the domain of interest. Preferably, the data set includes nouns that are non-stop words. The seed words are used to identify the most important topics for a domain of interest (e.g., a particular industry or activity.)

In some embodiments, to form the seed word set, potential seed words are selected based on word frequencies in a data set. For example, the top P (P being an integer that is empirically determined, such as 500) most frequently appearing nouns can be selected as seed words in some embodiments. In some embodiments, the top P most frequently appearing words are further filtered to prevent seed words from being too similar to each other. In particular, for a given word in the top P most frequently appearing words, if a certain number or percentage of its top most similar words also appear in the top most similar words of other already chosen seed word, then this word is removed from the seed word set and not used. For example, if 4 out of 10 top most similar words for a potential seed word also appear in the top 10 most similar words of any of the already chosen seed words, then this potential seed word is not added to the seed word set.

In some embodiments, to form the seed word set, the most common (e.g., highest frequency) word in the data set is initially selected and placed into the seed word set. The remaining words in the data set are compared with what is in the seed word in terms of their similarities to the existing seed word(s). A word from the remaining words that is the least similar to the existing seed words (e.g., has the lowest total similarity score) is added to the seed word set (and thus removed from the remaining non-seed word pool.) The process is iterated until a desired number of seed words (e.g., 500) are found.

At 404, for each seed word in the set of seed words, a topic cluster comprising topically (or equivalently, conceptually) related words found in the data set is formed. Specifically, the topically related words are topically related to the seed word. 404 can be repeated for each seed word in the set of seed words to form a plurality of topic clusters.

The process of forming a topic cluster is also referred to as the seed growing process. A number of seed growing techniques can be used. A link crawling technique and a weight ranking technique are described below.

When using a link crawling technique, a first set of similar words of the seed word are determined. A set of one or more qualified first similar words from the determined similar words are added to the topic cluster. In some embodiments, a depth-first processing technique is adopted, where an individual qualified first similar word is added to the topic cluster, then a second set of similar words of the qualified first similar word is determined. One or more qualified second similar words in the second set of similar words are determined and added to the topic cluster. In some embodiments, a breath-first processing technique is adopted, where all qualified first similar words are added to the topic cluster, then for each qualified first similar word, a second set of similar words for the each qualified first similar word is determined. One or more qualified second similar words in the second set of similar words are determined and added to the topic cluster.

Figure 5A:
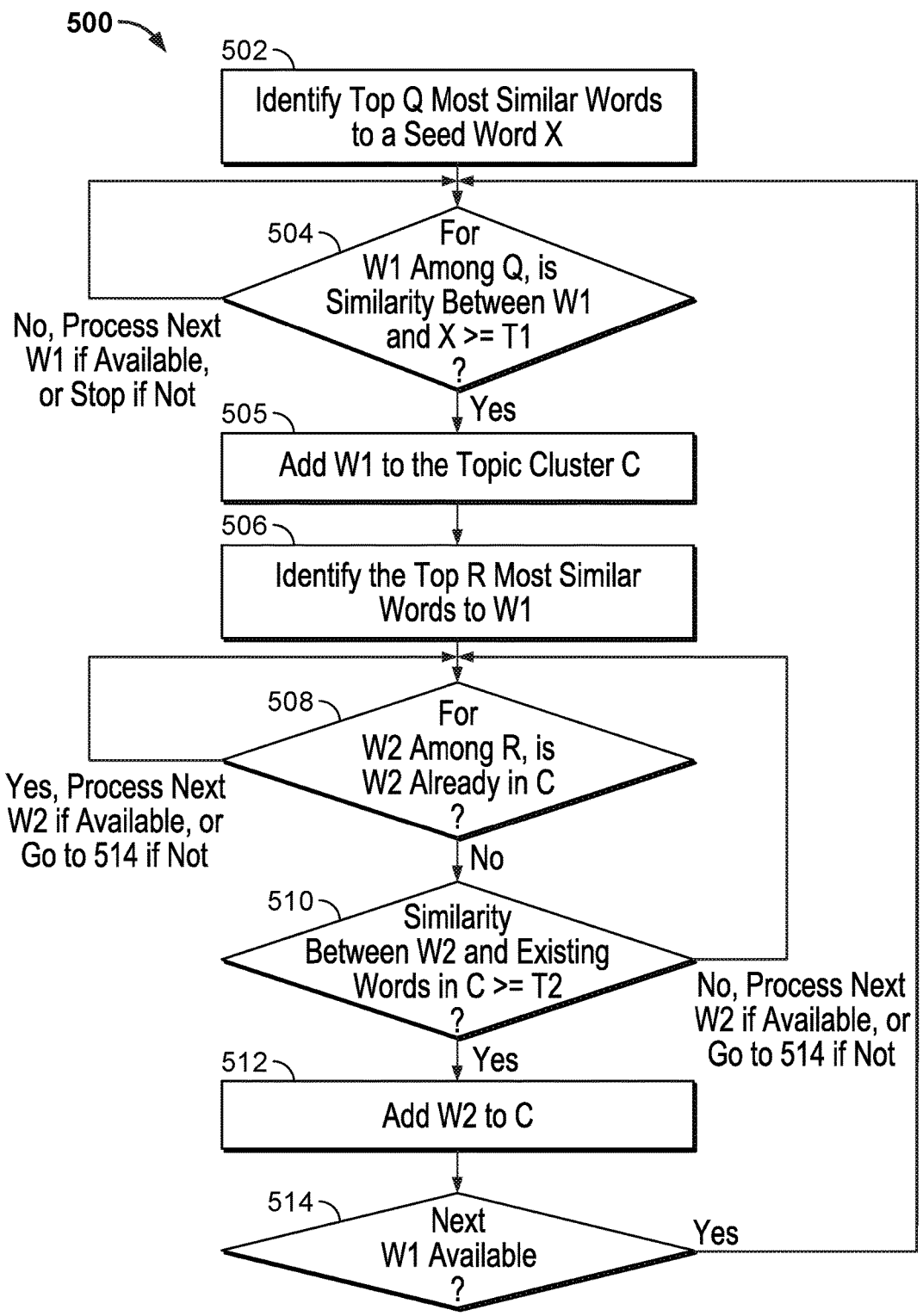
FIG. 5A is a flowchart illustrating an embodiment of a seed growing process based on depth-first link crawling.

FIG. 5A is a flowchart illustrating an embodiment of a seed growing process based on depth-first link crawling. Process 500 can be used to implement 404 of process 400.

At 502, for a seed word X, the top Q most similar words to X are identified in the training data set. Q is an integer whose value is empirically determined (e.g., 50). In some embodiments, a ranked list of words and their similarity scores relative to X can be obtained using the techniques described above (e.g., similarity measurement built upon vectorized words produced by tools such as word2vec, etc.). The top Q most similar words can be selected from the ranked list.

At 504, for a word (denoted as W1) among the top Q most similar words, it is determined whether the similarity between W1 and X is no less than a threshold T1. In some embodiments, the similarity score is used to measure the similarity. If the similarity is no less than T1, at 505, W1 is deemed to be a qualified first similar word and is added to the topic cluster (denoted as C) corresponding to seed word X (and thus removed from the non-cluster word pool); otherwise, W1 is not added to the topic cluster and control returns to 504 to evaluate the next W1 if available, or the process is stopped if a next word is unavailable (i.e., all Q words have been processed).

At 506, the top R most similar words to W1 are identified in the training data set. R is an integer whose value is empirically determined (e.g., 25). In some embodiments, R is set to be half of Q. In some embodiments, a ranked list of words and their similarity scores relative to W1 can be obtained using the techniques described above (e.g., similarity measurement built upon vectorized words produced by tools such as word2vec, etc.), and the top R most similar words are chosen from the ranked list.

At 508, for a word (denoted as W2) among the top R most similar words relative to W1, it is determined whether W2 already exists in the topic cluster C. If yes, no additional action needs to be performed, control returns to 508 if a next W2 is available, or to 514 if no more W2 is available for processing. If W2 does not already exist in C, at 510, it is determined whether the similarity between W2 and each existing word in the topic cluster C is no less than a threshold T2. In some embodiments, the similarity scores of W2 and each existing word in C are obtained using the method described above (e.g., similarity measurement built upon vectorized words produced by tools such as word2vec, etc.) and added. If the similarity sum is no less than T2, at 512, W2 is added to the topic cluster C corresponding to seed word X (and thus removed from the remaining non-cluster word pool); otherwise, control returns to 508 to evaluate the next W2 if available, or to 514 if no more W2 is available for processing. 508-512 is repeated until all R words are processed. At 514, it is determined whether the next W1 is available for processing. If so, control is returned to 504; otherwise, the process is completed.

Figure 5B:
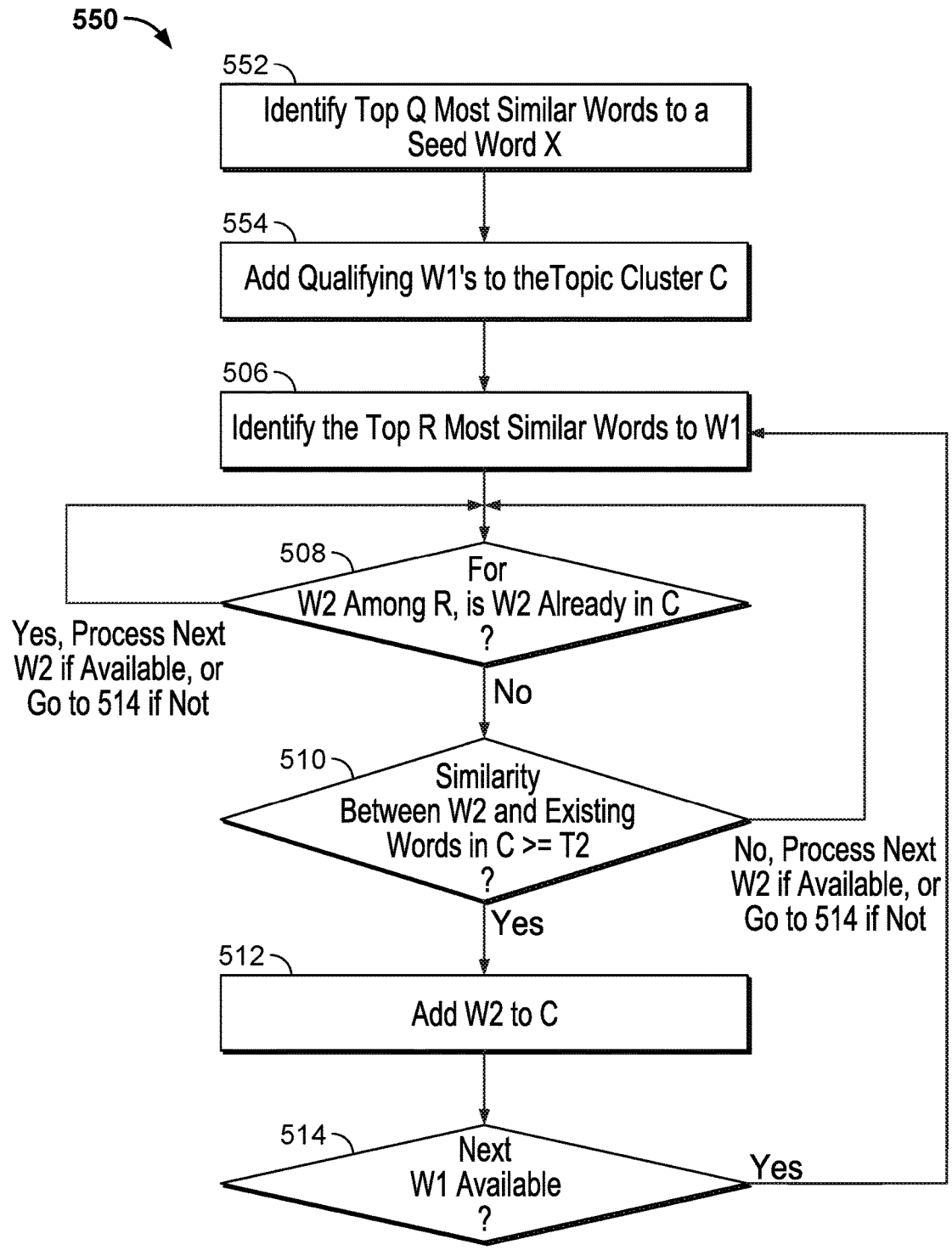
FIG. 5B is a flowchart illustrating an embodiment of a seed growing process based on breadth-first link crawling.

FIG. 5B is a flowchart illustrating an embodiment of a seed growing process based on breadth-first link crawling. Process 550 can also be used to implement 404 of process 400.

552 is similar to 502 of process 500. For a seed word X, the top Q most similar words to X are identified in the training data set. The top Q most similar words can be selected from the ranked list.

At 554, all qualifying similar words W1's from Q are added to the topic cluster C. A word W1 is deemed to be a qualifying similar word if its similarity relative to X is no less than a threshold T1.

For each qualifying similar word W1, 506-514 are performed. As shown, 506-514 in process 550 are the same as 506-514 of process 500, and are repeated until all qualifying similar words W1 are processed.

While T1 and T2 can be manually set, depending on the training data size used for word2vec, the derived similarity scores can be very different. For example, when the training data is small (e.g., a few thousand texts), the similarity scores between a seed and its most similar words can be as high as 0.9 or greater. When the training data size is large (e.g., a few hundred thousand texts), the similarity scores between a seed and its most similar words are typically in the range of 0.4-0.5. Thus, in some embodiments, T1 and T2 used in process 500 are automatically tuned.

Figure 6:
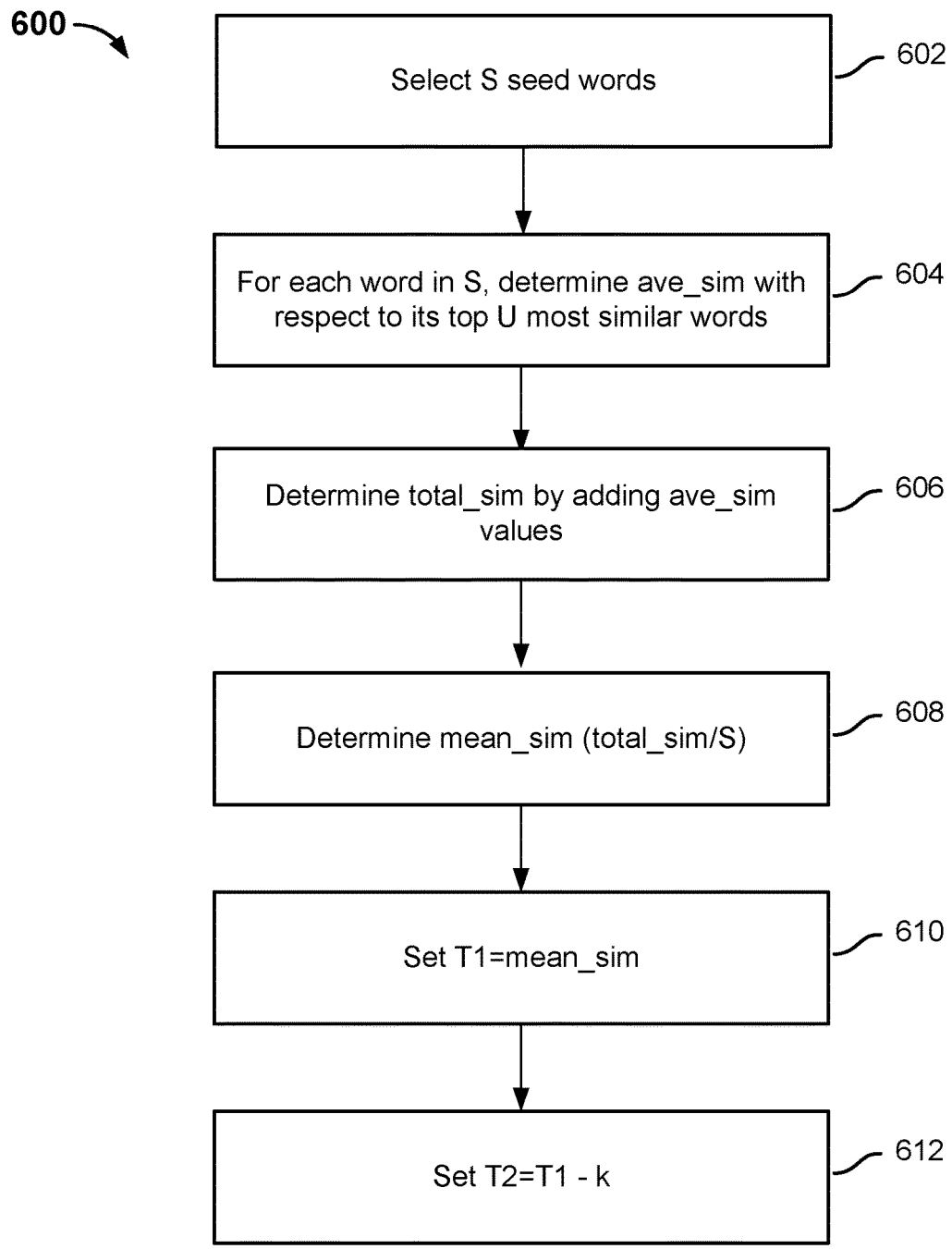
FIG. 6 is a flowchart illustrating an embodiment of a process for automatically discovering T1 and T2 values.

FIG. 6 is a flowchart illustrating an embodiment of a process for automatically discovering optimal T1 and T2 values. Process 600 can be performed on a system such as 100 of FIG. 1.

At 602, the top S seed words generated from the training data are selected. S is an integer that is empirically determined. In some embodiments, S is set to 50. S can also be set as the total number of the seed words. The seed words can be selected in a similar fashion as 402.

For each word in S, at 604, the average similarity (denoted as ave_sim) of that word with its top U most similar words is determined. U is an integer that is empirically determined. In some embodiments, U is set to 30. In some embodiments, the average similarity is determined by invoking the methods described above, adding the top U similarity scores then dividing by U.

At 606, a total similarity (denoted as total_sim) is determined by adding up the ave_sim values for all the words in S.

At 608, a mean similarity (denoted as mean_sim) is computed by dividing total_sim by the seed word sample size S.

At 610, the value for the first threshold T1 is set as mean_sim. T1 can also be set as other values based on the mean_sim. Some variations of the T1 value can be (mean_sim+k) or (mean_sim−k) in which k is a number between 0 and 1.

At 612, the value for the second threshold T2 is set as (T1−k), where k is an empirically determined constant such as 0.1. Lowering the threshold value will loosen up the requirement for adding words to the cluster as T2 is used for second level expansion or crawling.

Figure 7:
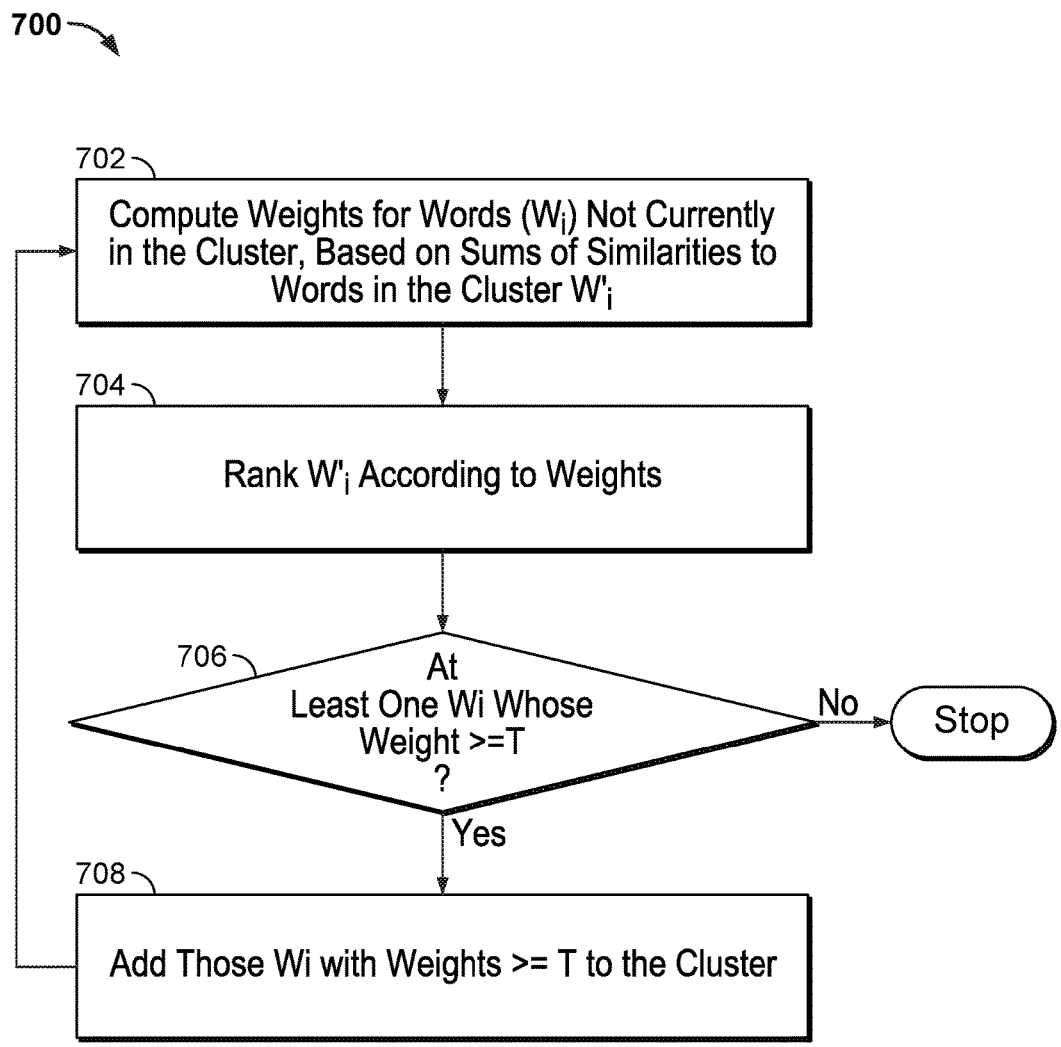
FIG. 7 is a flowchart illustrating an embodiment of a seed growing process.

FIG. 7 is a flowchart illustrating an embodiment of a seed growing process. Process 700 can be used to implement 404 of process 400. Process 700 utilizes a weight ranking technique.

Initially, the seed word is included in the cluster. At 702, weights for words not currently in the topic cluster are computed based on similarity sums. Specifically, for a given word that is not currently in the cluster (denoted as $W_i$), its weight is computed based on a sum of its similarity to each word currently in the cluster (denoted as $W'_i$). In some embodiments, the similarity between $W_i$ and $W'_i$ is determined using the methods described above (e.g., similarity measurement built upon vectorized words produced by tools such as word2vec, etc.).

In some embodiments, the following formula is used to compute the weight for $W_i$:

$$\text{weight}(W_i) = \text{sum\_i\_similarity}(W_i, W'_i)$$

At 704, $W_i$ are optionally ranked according to their weights.

At 706, it is determined whether there is at least one $W_i$ whose weight at least meets a similarity threshold T. The value of T is empirically determined and is set to 0.5 in some embodiments. If yes, at 708, those $W_i$'s with weights at least meeting the similarity threshold are added to the cluster (and thus removed from the non-cluster word pool.) Control is returned to 702 to repeat the process. If there is no $W_i$ whose weight at least meets the similarity threshold, the process is completed.

Text clustering and transformation based on topic clusters has been described. The technique described does not require a user to provide a predetermined number of clusters to be extracted and it significantly improves the accuracy of clustering, especially for short texts that tend to have little over-lapping words.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   generating a plurality of topic clusters, wherein a topic cluster among the plurality of topic clusters comprises a corresponding plurality of topically related words and a corresponding cluster identifier, the generation including:
      selecting a set of potential seed words from a data set;
      filtering the set of potential seed words to remove potential seed words within a threshold similarity of each other;
      forming a set of seed words based at least in part on the filtered set of potential seed words; and
      for a seed word in the set of seed words, forming a topic cluster comprising topically related words found in the data set, the topically related words being topically related to the seed word;
   identifying, for a set of non-stop words in a text, a corresponding set of related topic clusters relating to the set of non-stop words, the identification being based at least in part on the plurality of topic clusters;
   for non-stop words in the set of non-stop words that are identified to have corresponding set of related topic clusters, replacing the non-stop words with corresponding cluster identifiers of the corresponding related topic clusters to generate a clustered version of the text; and
   providing the clustered version of the text to be further analyzed.

2. The method of claim 1, wherein identifying, for a non-stop word included in the set of non-stop words in the text, a corresponding related topic cluster includes looking up in a mapping of non-stop words to related topic clusters any candidate related topic clusters that map to the non-stop word.

3. The method of claim 2, further comprising, in the event that no related topic cluster maps to the non-stop word, maintaining the non-stop word in the clustered version of the text.

4. The method of claim 1, wherein identifying, for a non-stop word included in the set of non-stop words in the text, a corresponding related topic cluster includes:
   looking up in a mapping of non-stop words to related topic clusters any candidate related topic clusters that map to the non-stop word;
   in the event that a single candidate related topic cluster is found to map to the non-stop word, selecting the single candidate related topic cluster as the related topic cluster for the non-stop word.

5. The method of claim 1, wherein identifying, for a non-stop word included in the set of non-stop words in the text, a corresponding related topic cluster includes:
   looking up in a mapping of non-stop words to related topic clusters any candidate related topic clusters that map to the non-stop word;
   in the event that a plurality of candidate related topic clusters are found to map to the non-stop word, comparing similarities of cluster identifiers of the plurality of candidate related topic clusters with the non-stop word and with one or more neighboring non-stop words in the text; and
   selecting as the related topic cluster the candidate related topic cluster having the greatest similarity with the non-stop word and with the one or more neighboring non-stop words in the text.

6. The method of claim 1, wherein the forming the topic cluster includes applying a word similarity measurement.

7. The method of claim 1, wherein the forming the topic cluster includes:
   determining a first set of similar words comprising similar words of the seed word;
   adding to the topic cluster a first set of one or more qualified first similar words from the first set of similar words, wherein the first set of one or more qualified first similar words at least meets a first similarity threshold with respect to the seed word;
   for a qualified similar word in the first set of one or more qualified first similar words:
      determining a second set of similar words of the qualified similar word;
      adding to the topic cluster a second similar word from the second set of similar words, wherein similarities between the second similar word and existing words in the topic cluster at least meet a second similarity threshold, and the second similar word is not found in the topic cluster prior to being added.

8. The method of claim 7, wherein the first similarity threshold, the second similarity threshold, or both, are automatically selected.

9. The method of claim 1, wherein the forming the topic cluster includes:
   adding to the topic cluster a set of words that is found in the data set and deemed to be most similar to the seed word;
   determining similarity weights of remaining words in the data set; and
   adding to the topic cluster those remaining words whose similarity weights at least meets a weight threshold.

10. The method of claim 9, wherein a similarity weight of a remaining word is determined based on a sum of similarities between the remaining word and existing words in the topic cluster.

11. A system, comprising:
one or more processors configured to:
generate a plurality of topic clusters, wherein a topic cluster among the plurality of topic clusters comprises a corresponding plurality of topically related words and a corresponding cluster identifier, the generation including:
selecting a set of potential seed words from a data set;
filtering the set of potential seed words to remove potential seed words within a threshold similarity of each other;
forming a set of seed words based at least in part on the filtered set of potential seed words; and
for a seed word in the set of seed words, forming a topic cluster comprising topically related words found in the data set, the topically related words being topically related to the seed word;
identify, for a set of non-stop words in a text, a corresponding set of related topic clusters relating to the set of non-stop words, the identification being based at least in part on the plurality of topic clusters;
for non-stop words in the set of non-stop words that are identified to have corresponding related topic clusters, replace the non-stop words with corresponding cluster identifiers of the corresponding set of related topic clusters to generate a clustered version of the text; and
provide the clustered version of the text to be further analyzed;
one or more memories coupled to the one or more processors and configured to provide the one or more processors with instructions.

12. The system of claim 11, wherein to identify, for a non-stop word included in the set of non-stop words in the text, a corresponding related topic cluster includes to look up in a mapping of non-stop words to related topic clusters any candidate related topic clusters that map to the non-stop word.

13. The system of claim 12, wherein the one or more processors are further configured to, in the event that no related topic cluster maps to the non-stop word, maintain the non-stop word in the clustered version of the text.

14. The system of claim 11, wherein to identify, for a non-stop word included in the set of non-stop words in the text, a corresponding related topic cluster includes to:
look up in a mapping of non-stop words to related topic clusters any candidate related topic clusters that map to the non-stop word;
in the event that a single candidate related topic cluster is found to map to the non-stop word, select the single candidate related topic cluster as the related topic cluster for the non-stop word.

15. The system of claim 11, wherein identifying, for a non-stop word included in the set of non-stop words in the text, a corresponding related topic cluster includes:
looking up in a mapping of non-stop words to related topic clusters any candidate related topic clusters that map to the non-stop word;
in the event that a plurality of candidate related topic clusters are found to map to the non-stop word, comparing similarities of cluster identifiers of the plurality of candidate related topic clusters with the non-stop word and with one or more neighboring non-stop words in the text; and
selecting as the related topic cluster the candidate related topic cluster having the greatest similarity with the non-stop word and with the one or more neighboring non-stop words in the text.

16. The system of claim 11, wherein to form the topic cluster includes to apply a word2vec model.

17. The system of claim 11, wherein to form the topic cluster includes to:
determine a first set of similar words comprising similar words of the seed word;
add to the topic cluster a first set of one or more qualified first similar words from the first set of similar words, wherein the first set of one or more qualified first similar words at least meets a first similarity threshold with respect to the seed word;
for a qualified similar word in the first set of one or more qualified similar words:
determine a second set of similar words of the qualified similar word;
add to the topic cluster a second similar word from the second set of similar words, wherein similarities between the second similar word and existing words in the topic cluster at least meet a second similarity threshold, and the second similar word is not found in the topic cluster prior to being added.

18. The system of claim 17, wherein the first similarity threshold, the second similarity threshold, or both, are automatically selected.

19. The system of claim 11, wherein to form the topic cluster includes to:
add to the topic cluster a set of words that is found in the data set and deemed to be most similar to the seed word;
determine similarity weights of remaining words in the data set; and
add to the topic cluster those remaining words whose similarity weights at least meets a weight threshold.

20. The system of claim 19, wherein a similarity weight of a remaining word is determined based on a sum of similarities between the remaining word and existing words in the topic cluster.

21. A computer program product embodied in a tangible non-transitory computer readable storage medium and comprising computer instructions for:
generating a plurality of topic clusters, wherein a topic cluster among the plurality of topic clusters comprises a corresponding plurality of topically related words and a corresponding cluster identifier, the generation including:
selecting a set of potential seed words from a data set;
filtering the set of potential seed words to remove potential seed words within a threshold similarity of each other;
forming a set of seed words based at least in part on the filtered set of potential seed words; and
for a seed word in the set of seed words, forming a topic cluster comprising topically related words found in the data set, the topically related words being topically related to the seed word;
identifying, for a set of non-stop words in a text, a corresponding set of related topic clusters relating to the set of non-stop words, the identification being based at least in part on the plurality of topic clusters;
for non-stop words in the set of non-stop words that are identified to have corresponding related topic clusters, replacing the non-stop words with corresponding cluster identifiers of the corresponding set of related topic clusters to generate a clustered version of the text; and providing the clustered version of the text to be further analyzed.

* * * * *